(12) United States Patent
Schulz et al.

(10) Patent No.: US 7,659,688 B2
(45) Date of Patent: Feb. 9, 2010

(54) METHOD AND SYSTEM FOR RESOLVER ALIGNMENT IN ELECTRIC MOTOR SYSTEM

(75) Inventors: Steven E. Schulz, Torrance, CA (US); Sean E Gleason, West Bloomfield, MI (US); Brian A Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 375 days.

(21) Appl. No.: 11/743,709

(22) Filed: May 3, 2007

(65) Prior Publication Data

US 2008/0272731 A1 Nov. 6, 2008

(51) Int. Cl.
*H02P 23/00* (2006.01)

(52) U.S. Cl. .................. 318/807; 318/609; 318/661

(58) Field of Classification Search ............... 318/807, 318/609, 661, 723, 812, 571, 615, 610, 400.11, 318/803, 400.04, 432, 434
See application file for complete search history.

(56) References Cited

U.S. PATENT DOCUMENTS

| 2006/0113949 A1* | 6/2006 | Nishimura et al. ........ 318/723 |
| 2007/0061060 A1* | 3/2007 | Karrelmeyer et al. ....... 701/67 |

* cited by examiner

*Primary Examiner*—Karen Masih
(74) *Attorney, Agent, or Firm*—Ingrassia Fisher & Lorenz, P.C.

(57) ABSTRACT

Methods and systems are provided for aligning a resolver in an electric motor system. The method includes commanding a d-axis current command and a speed command, operating an electric motor without a load in response to the d-axis current command and the speed command, determining a rotor speed in response to the speed command, and determining an offset of the resolver based on the speed command and the rotor speed when the rotor speed has substantially stabilized.

20 Claims, 3 Drawing Sheets

METHOD AND SYSTEM FOR RESOLVER ALIGNMENT IN ELECTRIC MOTOR SYSTEM

TECHNICAL FIELD

The present invention generally relates to determining rotor positions in electric motor systems, and more particularly relates to methods and apparatus for aligning resolvers.

BACKGROUND OF THE INVENTION

In some types of electric motors, controlling the motor is based in part on its rotor position. For example, permanent magnet (PM) synchronous motors utilize rotor position information for accurate torque control. The rotor position is typically measured with a resolver or a similar rotation sensing device. The rotor of the resolver is coupled to the machine rotor of the PM synchronous motor. For vector control, the resolver is generally aligned to the north pole of the machine rotor magnet (e.g., aligned with a controller d-axis). The accuracy by which the resolver can be aligned typically influences the accuracy and performance of the motor control.

In some electric motors, the resolver is aligned during the assembly process. A high degree of precision is typically desired from the alignment process, which is generally provided by individually testing each electric motor and manually adjusting the resolver. For large volume manufacturing, this alignment process may be costly, time consuming, and complicated. One sensorless motor control technique injects a high frequency voltage signal (e.g., in the range of about 500 Hz to about 2 kHz) into the stator of the electric motor and measures the current produced in response to the high frequency signal. The measured current is used to estimate the resolver alignment. Acoustic noise is generated when the high frequency signal has a large magnitude. Additionally, the frequency range commonly associated with the high frequency signal is within a sensitive range for humans. Further, the high frequency signal method is poorly suited for machines with inherently low saliency, such as surface mount PM motors.

Accordingly, it is desirable to provide a method and system for resolver alignment in electric motor systems that minimize assembly and manufacturing costs associated with the electric motor systems. Additionally, it is desirable to provide a method and system for resolver alignment that minimize acoustic noise generation. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Method and system are provided for resolver alignment in an electric motor system. In one embodiment, a method is provided for aligning a resolver. The resolver is operable to determine a rotor position in an electric motor with respect to a d-axis. The method comprises commanding a d-axis current command and a speed command, operating the electric motor without a load in response to the d-axis current command and the speed command, determining a rotor speed in response to the speed command, and determining an offset of the resolver based on the speed command and the rotor speed when the rotor speed has substantially stabilized.

In another embodiment, a method for aligning a resolver comprises decoupling the load from the electric motor, commanding a current command and a speed command, operating the electric motor at a non-zero speed in response to the current command and the angular speed command, determining an offset of the resolver, coupling the load to the electric motor, and determining the rotor position based on the offset. The electric motor generates substantially zero torque in response to the current command.

In another embodiment, a system is provided for aligning a resolver. The resolver is operable to determine a rotor position in an electric motor with respect to a d-axis. The system comprises a current regulator having an input for receiving a current command and having an output for coupling to the electric motor, and a speed regulator having an input for receiving a speed command and the rotor position and having an output coupled to the current regulator. The current regulator is configured to produce a current based on the current command, and the electric motor generates substantially zero torque in response to the current. The speed regulator is configured to maintain a substantially constant speed of the electric motor in response to the speed command, and produce an offset when maintaining the substantially constant speed, the offset aligning the rotor position with the d-axis.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

In an exemplary embodiment, a method and system are provided for aligning a resolver or other rotor position sensing device mounted to the machine rotor of an electric motor. Such electric motors are used in a variety of applications, including vehicle applications, and may be controlled via a voltage source inverter. If the electric motor operates without a load (e.g., without the electric motor being coupled to an axle in a vehicle application) and at a substantially constant rotational speed, a drag torque (e.g., resulting from lubricants and the like) is applied to the motor shaft. In general, the drag torque is relatively low for an efficient drive system. To maintain this constant speed, the electric motor generates an electrical torque to balance the drag torque, which can be accomplished with speed regulation (e.g., a speed regulating loop).

By applying a d-axis current command, the resolver alignment can be adjusted during the process of balancing the electrical torque with the drag torque. For example, a resolver offset angle is associated with an electrical offset error that produces this electrical torque for a particular d-axis current command. In a hybrid vehicle, the motor speed can be decoupled from the axle speed. The alignment procedure can be performed after the electric motor is assembled with the result (e.g., a resolver offset angle) stored in a memory (e.g., a non-volatile memory such as an electronically eraseable programmable read-only memory (EEPROM)) or performed at appropriate moments of a normal drive cycle (e.g., during a "key-off" moment). The resolver offset is subsequently implemented as a correction term for combination with a raw rotor position measurement (e.g., as determined by the resolver).

Figure 1:
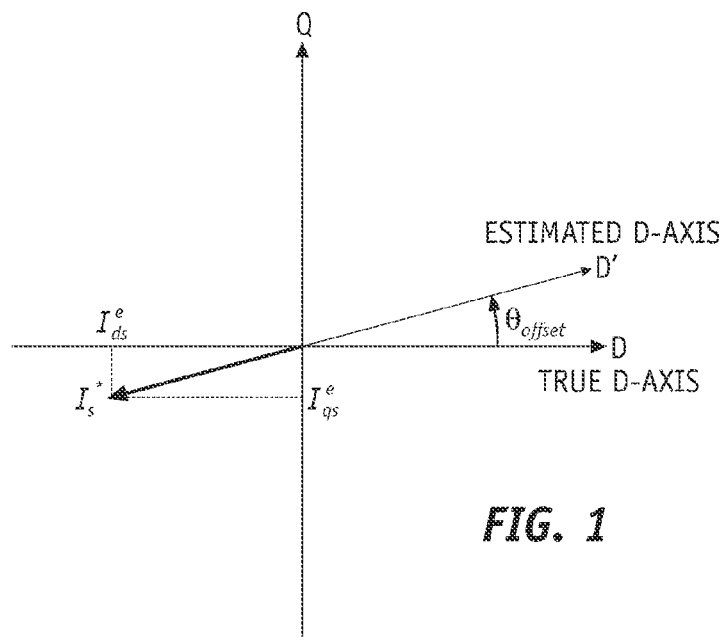
FIG. 1 is a vector diagram of a stator current command.

Referring to FIG. 1, a stator current command ($I_s$*) useful in understanding the effect of resolver angle error is shown. The application of stator current in a correct d-axis generates zero electrical torque. If resolver alignment error exists, the applied stator current is not actually applied in the correct axis. The stator current command ($I_s$*) is commanded to flow in an estimated negative d-axis. With a positive offset error ($\theta_{offset}$) in the estimated d-axis, the true stator current is divided into both the d-axis and the q-axis. For example, the stator current command ($I_s$*) has a d-axis stator current ($I_{ds}^e$) and a q-axis stator current ($I_{qs}^e$). The negative q-axis stator current ($I_{qs}^e$) results in a negative torque production (e.g., a generator mode of the electric motor if the machine is rotating with positive speed). Conversely, a negative offset error (not shown) in the estimated d-axis results in a positive q-axis current and positive torque production.

Figure 2:
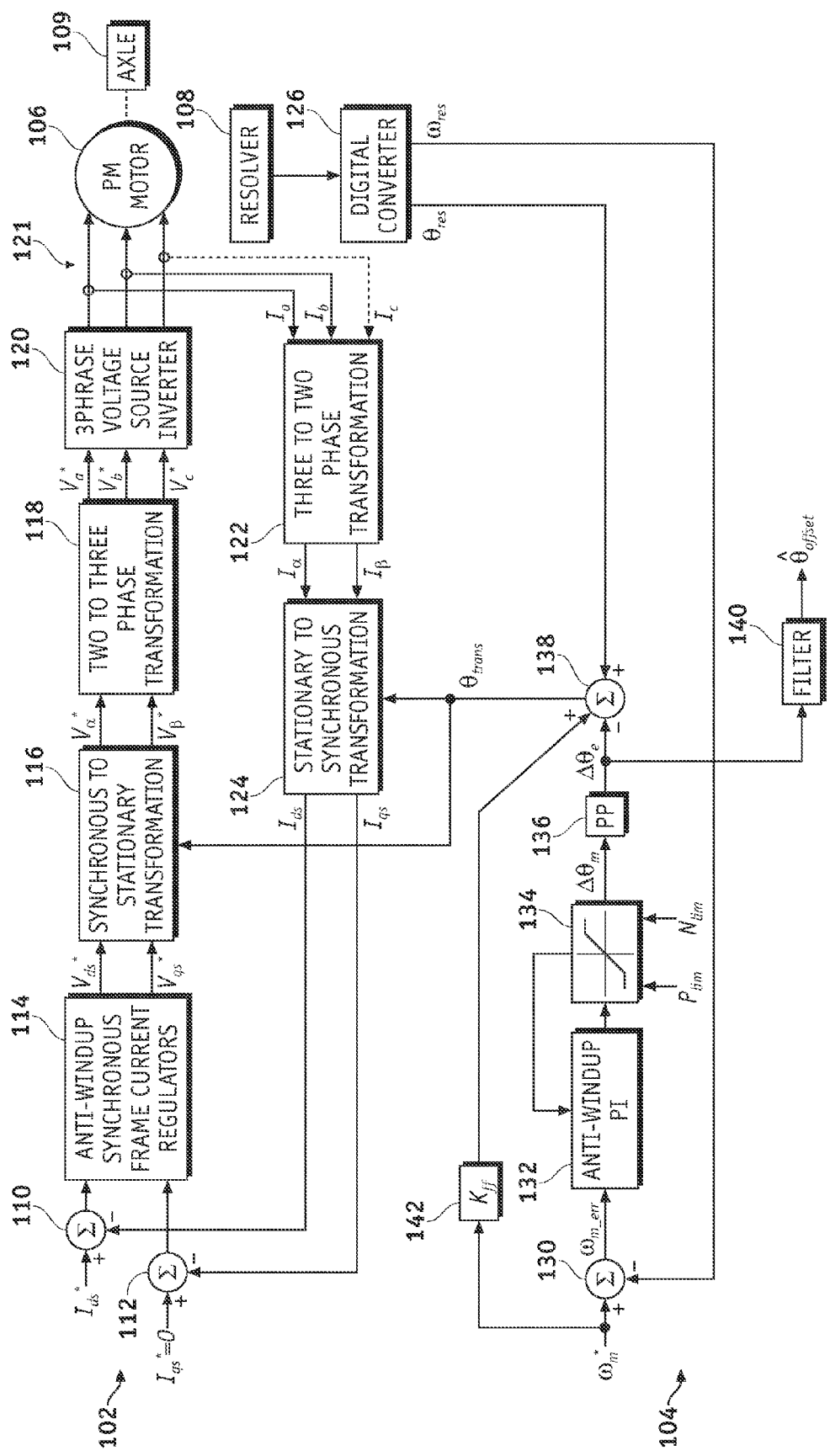
FIG. 2 is a block diagram of an alignment system in accordance with an exemplary embodiment.

FIG. 2 is a block diagram of an alignment system 100 in accordance with an exemplary embodiment. The alignment system 100 comprises a current regulator 102, a speed regulator 104 having an output coupled to an input of the current regulator 102, an electric motor 106 (e.g., a permanent magnet (PM) synchronous motor) coupled to an output of the current regulator 102, and a resolver 108, or other rotor position sensing device, coupled to the electric motor 106. One or more components of the current regulator 102 and/or the speed regulator 104 may be may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

The electric motor 106 is a synchronous motor or the like, and preferably a permanent magnet (PM) synchronous motor. In this embodiment, the electric motor 106 is decoupled from an axle 109, such that the electric motor 106 can operate without a load for resolver alignment. The resolver 108, or other rotor position sensing device, determines a rotor position of the electric motor 106. In one embodiment, the resolver 108 is coupled to the rotor shaft of the electric motor 106. The magnetic north of the rotor corresponds to the d-axis. By measuring a resolver position ($\theta_{res}$) with respect to the d-axis, the resolver position is intended to represent the rotor position of the electric motor 106. In one embodiment, the resolver position ($\theta_{res}$) is supplied to a digital converter circuit 126, and the digital converter circuit 126 converts the resolver position ($\theta_{res}$) to a digital representation (e.g., a digital word), which may be utilized in a software embodiment to determine an angular speed ($\omega_{res}$) of the electric motor 106 based on the measurement of the resolver 108. The measured angular speed of the electric motor 106 may also be derived from the resolver position ($\theta_{res}$) using other devices. The resolver position ($\theta_{res}$) and the measured angular speed ($\omega_{res}$) of the electric motor 106 are provided to the speed regulator 104.

Based on a current command (e.g., $I_{ds}$* and $I_{qs}$*), the current regulator 102 provides a voltage to drive the electric motor 106. In one embodiment, the current regulator 102 comprises summing blocks 110 and 112, an anti-windup synchronous frame current regulator 114 having an input coupled to the summing blocks 110 and 112, a synchronous-to-stationary transformation block 116 having an input coupled to an output of the anti-windup synchronous frame current regulator 114 (or other effective regulator topology known in the art), a two-to-three phase transformation block 118 having an input coupled to an output of the synchronous-to-stationary transformation block 116, and a three-phase voltage source inverter 120 having an input coupled to an output of the two-to-three phase transformation block 118 and having an output coupled to the electric motor 106. In another embodiment, the three-phase voltage source inverter 120 is an individual component of the alignment system 100.

To minimize torque generation by the current command, a stator current command is applied to the d-axis without applying a stator current command to the q-axis. For example, a d-axis current command ($I_{ds}$*) with a magnitude less than about zero and a q-axis current command ($I_{qs}$*) of about zero are supplied to the current regulator 102. For PM synchronous machines, the d-axis current command is often restricted to negative values. The summing blocks 110 and 112 produce a synchronous frame current error based on a comparison of the current commands ($I_{ds}$* and $I_{qs}$*) with synchronous frame measured currents ($I_{ds}$ and $I_{qs}$) corresponding with the current commands ($I_{ds}$* and $I_{qs}$*). For example, the summing block 110 produces a d-axis synchronous frame current error based on a difference between the d-axis current command ($I_{ds}$*) and a measured d-axis synchronous frame current ($I_{ds}$), and the summing block 112 produces a q-axis synchronous frame current error based on a difference between the q-axis current command ($I_{qs}$*) and a measured q-axis synchronous frame current ($I_{qs}$).

The output of the summing blocks 110 and 112 are supplied to the anti-windup synchronous frame current regulator 114, which produces synchronous frame voltage commands ($V_{ds}$* and $V_{qs}$*). The synchronous-to-stationary transformation block 116 transforms the synchronous frame voltage commands ($V_{ds}$* and $V_{qs}$*) to stationary frame voltage commands ($V_\alpha$* and $V_\beta$*) using a transformation angle ($\theta_{trans}$), and the two-to-three phase transformation block 118 transforms the two-phase (e.g., $\alpha$ and $\beta$) stationary frame voltage commands ($V_\alpha$* and $V_\beta$*) to three-phase voltage commands ($V_a$*, $V_b$*, and $V_c$*). The three-phase voltage commands are converted to actual phase voltages by the three-phase voltage source inverter 120 and supplied to the electric motor 106.

For feedback regulation of the electric motor 106, the current regulator 102 additionally comprises a three-to-two phase transformation block 122 having an input coupled to the output of the three-phase voltage source inverter 120, and a stationary-to-synchronous transformation block 124 having a first input coupled to an output of the three-to-two phase transformation block 122 and having an output coupled to the summing blocks 110 and 112. One or more current sensors 121 may be utilized to measure at least two of three phase currents (e.g., $I_a$, $I_b$, and $I_c$) corresponding with the actual phase currents supplied to the electric motor 106 by the three-phase voltage source inverter 120. Although all three phase currents ($I_a$, $I_b$, and $I_c$) may be measured, the third phase current may be determined based on two measured phase currents.

The three-to-two phase transformation block 122 transforms the measured three-phase currents ($I_a$, $I_b$, and $I_c$) to measured two-phase (e.g., $\alpha$ and $\beta$) currents ($I_\alpha$ and $I_\beta$). The stationary-to-synchronous transformation block 124 converts the measured two-phase currents ($I_\alpha$ and $T_\beta$), which are in the stationary frame, to the measured synchronous frame currents (e.g., the measured d-axis synchronous frame current ($I_{ds}$) and the measured q-axis synchronous frame current ($I_{qs}$)) using the transformation angle ($\theta_{trans}$). The measured synchronous frame currents ($I_{ds}$ and $I_{qs}$) are supplied to the summing block 110 and 112, respectively.

The speed regulator 104 controls the angular speed or rotational speed of the electric motor 106 in response to an angular velocity command (e.g., a speed command ($\omega_m^*$) in units of mechanical rads/sec). The speed regulator 104 comprises a first summing block 130, an anti-windup proportional-integral (PI) controller 132 having a first input coupled to an output of the summing block 130, a limiter 134 having an input coupled to an output of the anti-windup PI controller 132 and having a first output supplying a feedback signal to the anti-windup PI controller 132, a gain block 136 having an input coupled to a second output of the limiter 134, a second summing block 138 having a first input coupled to an output of the gain block 136, and a filter 140 having an input coupled to the output of the gain block 136. Based on the speed command ($\omega_m^*$), the resolver position ($\theta_{res}$), and the measured angular speed ($\omega_{res}$) of the electric motor 106, the speed regulator 104 produces the transformation angle ($\theta_{trans}$) and a resolver offset ($\theta_{offset}$). The speed command ($\omega_m^*$) may be selected to sufficiently overcome static friction, or stiction, and match with the filter 140 with torque ripple that may be produced by the electric motor 106 in response to the speed command ($\omega_m^*$).

The first summing block 130 compares the speed command ($\omega_m^*$) to the measured angular speed ($\omega_{res}$) and outputs an angular speed error ($\omega_{m\_err}$) based on a difference between the speed command ($\omega_m^*$) and the measured angular speed ($\omega_{res}$). The anti-windup PI controller 132 converts the angular speed error ($\omega_{m\_err}$) to an angle, and the limiter 134 limits the angle between a minimum limit (Nlim) and a maximum limit (Plim). Although the anti-windup PI controller 132 is a PI type regulator, other regulators may be used. The maximum and minimum limits (Plim and Nlim) may be selected such that the limiter 134 prevents the speed regulator 104 from changing position (e.g., angular position) beyond pre-determined margins from a nominal value. For example, the maximum and minimum limits (Plim and Nlim) may be selected to provide sufficient torque during transients, allow for a maximum expected resolver misalignment, and prevent a feedback from reversing polarity.

The output of the limiter 134 is a mechanical angle error ($\Delta\theta_m$). The gain block 136 multiplies the mechanical angle error ($\Delta\theta_m$) by the number of pole-pairs (PP) of the electric motor 106 to produce an electrical angle error ($\Delta\theta_e$). The resolver position is supplied to a second input of the second summing block 138, and the second summing block 138 subtracts the electrical angle error ($\Delta\theta_e$) from the resolver position ($\theta_{res}$) to produce the transformation angle ($\theta_{trans}$). In one embodiment, the speed regulator 104 may further comprise a feedforward gain block 142 having an input for receiving the speed command ($\omega_m^*$) and an output coupled to a third input of the second summing block 138. For example, the feedforward gain block 142 may be utilized to compensate (e.g., via a feedforward gain ($K_{ff}$)) for a known drag torque of the electric motor 106 to further improve the offset determination. In this embodiment, the feedforward gain block 142 multiplies the speed command ($\omega_m^*$) by the feedforward gain ($K_{ff}$) and combined with the difference between the electrical angle error ($\Delta\theta_e$) and the resolver position ($\theta_{res}$) by the second summing block 138 to produce the transformation angle ($\theta_{trans}$).

The electrical angle error ($\Delta\theta_e$) is an estimate of the resolver offset. This estimate may be further filtered by the filter 140 to improve the estimation. In one embodiment, the output of the filter 140 is the resulting resolver offset ($\theta_{offset}$). After the speed regulator 104 has stabilized to maintain the electric motor 106 at a substantially constant speed (e.g., in response to the speed command ($\omega_m^*$)), the resulting resolver offset ($\theta_{offset}$) may be used to compensate for the raw rotor position measurement obtained by the resolver 108 during a normal operation of the electric motor 106, such as with a load (e.g., the axle 109) coupled to the electric motor 106. In one embodiment, the resolver offset is stored in a non-volatile memory for used during normal operation of the electric motor 106.

Figure 3:
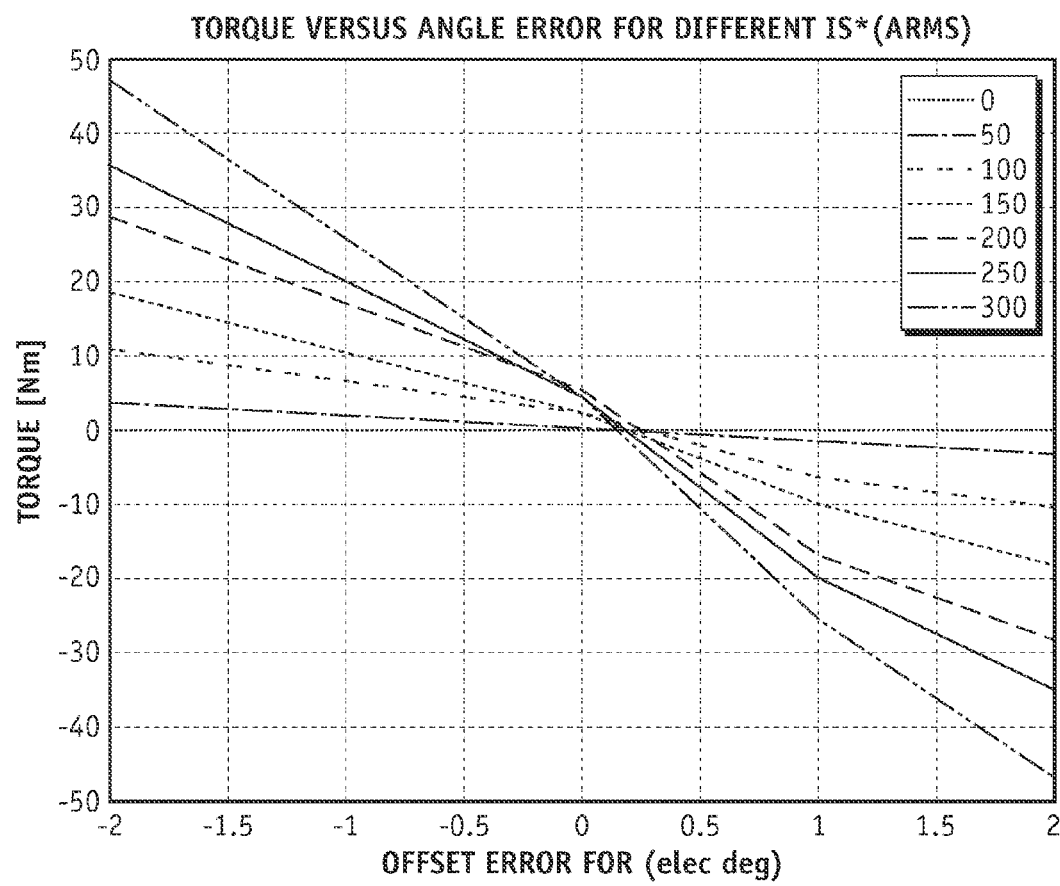
FIG. 3 is a graph of electrical torque in relation to offset error for varying stator current commands.

The stator current command (e.g., the d-axis current command ($I_{ds}^*$)) may be selected based on a desired offset error to balance the drag torque with the electrical torque. FIG. 3 is a graph of electrical torque in relation to offset error for varying stator current commands. For various d-axis current commands, the electrical torque produced by an electrical motor (e.g., the electric motor 106 shown in FIG. 2) is plotted for the current amplitudes (e.g., 0 $A_{rms}$, 50 $A_{rms}$, 100 $A_{rms}$, 150 $A_{rms}$, 200 $A_{rms}$, 250 $A_{rms}$, and 300 $A_{rms}$) of the various stator current commands. For low offset errors, the electrical torque-offset error relationship is approximately linear. For greater current amplitudes, the electrical torque-offset error relationship increases in slope. This slope represents a sensitivity of the electrical torque with respect to the offset error. In one example, the electrical motor has a drag torque of about 3 Nm and a d-axis current command of about 200 $A_{rms}$. To generate an electrical torque to balance this drag torque, an offset error of less than about 0.5 degree can be obtained.

Figure 4:
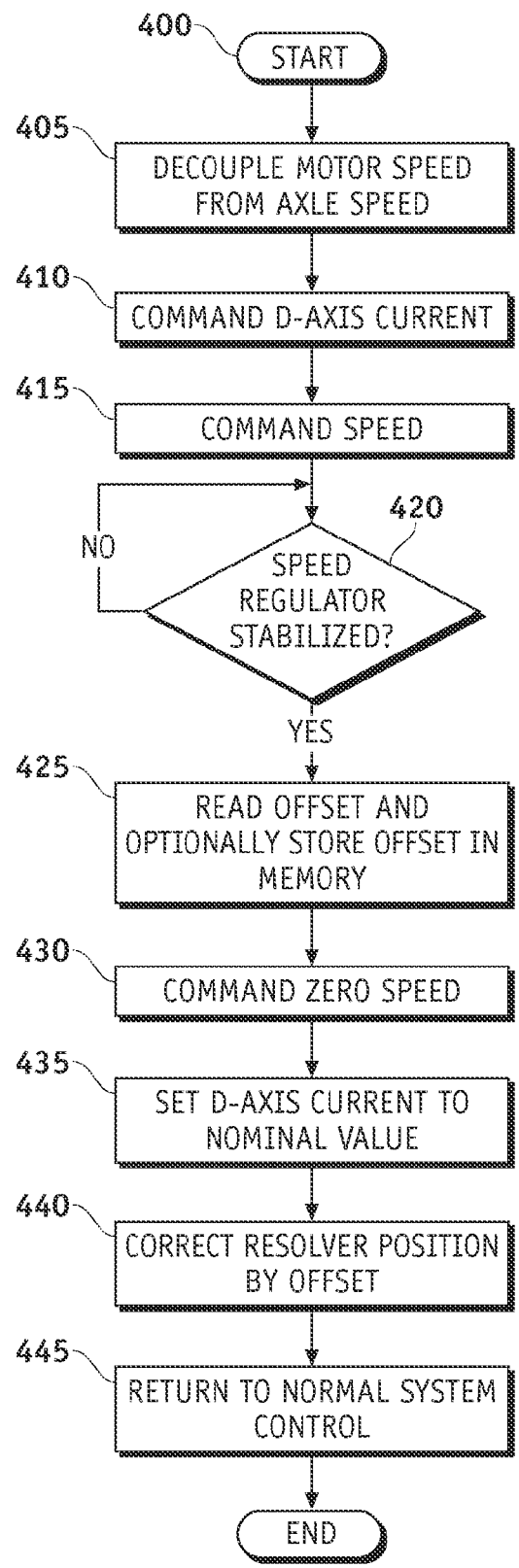
FIG. 4 is a flow diagram of a method for resolver alignment in accordance with an exemplary embodiment.

FIG. 4 is a flow diagram of a method 400 for resolver alignment in accordance with an exemplary embodiment. An electric motor is decoupled from a load, as indicated at step 405. Referring to FIGS. 2 and 4, the electric motor 106 is decoupled from the axle 109 in a vehicle application. Decoupling the axle 109 from the electric motor 106 permits a substantially "free-spin" operation of the electric motor 106, with the exception of drag torque, and may be accomplished by initializing the transmission to decouple the electric motor speed from the axle speed, for example. A d-axis current is commanded, as indicated at step 410. For example, a d-axis current command ($I_{ds}^*$) less than zero and a q-axis current command ($I_{qs}^*$) of about zero are supplied to the current regulator 102. The commanded d-axis current may be selected based on the drag torque of the electric motor 106 and a desired accuracy of resolver offset (e.g., the offset error indicated in FIG. 3).

An angular velocity is commanded, as indicated at step 415. For example, a speed command ($\omega_m^*$) is supplied to the speed regulator 104. The electric motor 106 is thus operated, decoupled from the axle 109, in response to the d-axis current command ($I_{ds}^*$) and the speed command ($\omega_m^*$). In one embodiment, a current error is produced (e.g., via the summing block 110) based on a difference between the d-axis current command ($I_{ds}^*$) and a measured d-axis synchronous current ($I_{ds}$) and may additionally be based on a difference between the q-axis current command ($I_{qs}^*$) and a measured q-axis synchronous current ($I_{qs}$). A stationary voltage command (e.g., a stationary d-axis voltage command ($V_\alpha^*$) and a stationary q-axis voltage command ($V_\beta^*$)) is produced (e.g., via the anti-windup synchronous frame current regulator 114 and the synchronous-to-stationary transformation block 116) from the current error. A voltage (e.g., three voltages for each phase of the electric motor 106) is produced (e.g., via the two-to-three phase transformation block 118 and the three-phase voltage source inverter 120) based on the stationary voltage command. The voltage is supplied to the electric motor 106, and the measured d-axis synchronous current ($I_{ds}$) is produced based on the phase current corresponding with the voltage supplied to the electric motor 106. For example, the current sensor 121 measures at least two of three phase currents ($I_a$, $I_b$, and $I_c$) based on the voltage supplied to the electric motor 106 for each phase, the three-to-two phase transformation block 122 transforms the phase currents ($I_a$, $I_b$, and $I_c$) to an equivalent two-phase current ($I_\alpha$ and $I_\beta$), and the stationary-to-synchronous transformation block 124 transforms the two-phase current ($I_\alpha$ and $I_\beta$) to the measured d-axis synchronous current ($I_{ds}$) and the measured q-axis synchronous current ($I_{qs}$).

A determination is made as to whether the speed regulator has sufficiently stabilized, as indicated at step 420. When the speed regulator 104 has sufficiently stabilized, the rotor speed of the electric motor 106 is substantially constant, and the electric torque produced by the electric motor 106 is balanced with the drag torque. In one embodiment, a determination is made as to whether the rotor speed, produced by the electric motor 106 in response to the speed command ($\omega_m^*$), has sufficiently stabilized, thereby indicating that the speed regulator has sufficiently stabilized. If the speed regulator 104 has not sufficiently stabilized, the step 420 is repeated (e.g., the determination as to whether the speed regulator has sufficiently stabilized is repeated).

If the speed regulator 104 has sufficiently stabilized, a resolver offset is determined, as indicated at step 425. For example, the resolver offset ($\theta_{offset}$) is read from the speed regulator 104 (e.g., from the output of the filter 140) once the speed regulator 104 has sufficiently stabilized. In one embodiment, an angular speed error ($\omega_{m\_err}$) is produced (e.g., via the summing block 130) based on a difference between the speed command ($\omega_m^*$) and a measured angular speed ($\omega_{res}$). For example, a resolver position ($\theta_{res}$) is measured by the resolver 108, with respect to the d-axis, and the angular speed ($\omega_{res}$) may be determined based on the resolver position ($\theta_{res}$). The angular speed error ($\omega_{m\_err}$) is converted to a mechanical angular error ($\Delta\theta_m$), and the mechanical angular error ($\Delta\theta_m$) is converted (e.g., via the gain block 136) to an electrical angular error ($\Delta\theta_e$). The electrical angular error is an initial estimate of the resolver offset. In another embodiment, the angular speed error ($\omega_{m\_err}$) is converted to an angle (e.g., via the anti-windup PI controller 132), and the angle is limited (e.g., via the limiter 134) based on at least one of a minimum torque generation of the electric motor 106, a maximum resolver misalignment, and a direction of the resolver offset. To convert the mechanical angular error ($\Delta\theta_m$) to the electrical angular error ($\Delta\theta_e$), the mechanical angular error is multiplied by the number of pole-pairs of the electric motor 106.

A transformation angle ($\theta_{trans}$) may be determined from the electrical angular error ($\Delta\theta_e$) based on a difference between the resolver position and the electrical angular error. If the drag torque is known, the drag torque may be compensated by a feedforward term in determining the transformation angle ($\theta_{trans}$). For example, the product of the speed command ($\omega_m^*$) and a feedforward gain ($K_{ff}$) is combined with the difference between the resolver position ($\theta_{res}$) and the electrical angular error ($\Delta\theta_e$) to produce the transformation angle ($\theta_{trans}$). The transformation angle ($\theta_{trans}$) may be utilized in the current regulator 102 for synchronous-to-stationary transformations and for stationary-to-synchronous transformations. For example, the transformation angle ($\theta_{trans}$) is supplied to the synchronous-to-stationary transformation block 116 and the stationary-to-synchronous transformation block 124 during operation of the current regulator 102.

A final resolver offset ($\theta_{offset}$) may be determined by filtering (e.g., via the filter 140) the electrical angular error ($\Delta\theta_e$). For example, depending on the speed command ($\omega_m^*$), a torque ripple may be produced by the electric motor resulting in speed oscillation. The filter 140 substantially removes this torque ripple induced speed oscillation. The resolver offset ($\theta_{offset}$) may be stored in a non-volatile memory (e.g., in EEPROM) for retrieval during normal operation of the electric motor 106 (e.g., with the electric motor 106 coupled to the axle 109).

A rotational speed is commanded to zero or to a predetermined set-point, as indicated at step 430. For example, the speed command ($\omega_m^*$) is modified to zero or the predetermined set-point. A default nominal value is commanded for the d-axis current, as indicated at step 435. For example, the d-axis current command ($I_{ds}^*$) is modified to the default nominal value. The resolver offset is utilized to adjust the resolver position, as indicated at step 440. For example, the resolver position measured by the resolver 108 during normal operation of the electric motor 106 is adjusted by the resolver offset ($\theta_{offset}$) (e.g., via software) thereby aligning the resolver position, and thus the rotor position, with the true d-axis (e.g., the magnetic north of the rotor of the electric motor 106). Control of the electric motor is returned to a normal default operation state (e.g., for operation of the electric motor with the load), as indicated at step 445.

Aligning a resolver with the alignment system 100 minimizes acoustic noise generation and increases the accuracy of measured rotor positions using the aligned resolver. Manufacturing costs associated with electric motors and systems incorporating one or more electric motors, particularly PM synchronous motors, may be significantly reduced using the alignment system 100 by permitting a wider band of resolver alignment tolerance at the time of resolver installation (e.g., prior to departing the manufacturing line).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for aligning a resolver, the resolver operable to determine a rotor position in an electric motor with respect to a d-axis, the method comprising the steps of:
    commanding a d-axis current command and a speed command;
    operating the electric motor without a load in response to the d-axis current command and the speed command;
    determining a rotor speed in response to the speed command; and
    determining an offset of the resolver based on the speed command and the rotor speed when the rotor speed has substantially stabilized.

2. A method according to claim 1, wherein the commanding step comprises commanding the d-axis current command less than about zero while commanding a q-axis current command of about zero.

3. A method according to claim 1, wherein the electric motor has a drag torque associated with an operation thereof, and wherein the step of commanding a d-axis current command comprises selecting the d-axis current command based on the drag torque of the electric motor and a pre-determined accuracy of the offset.

4. A method according to claim 1, further comprising:
determining a resolver position; and
adjusting the resolver position by the offset to produce the rotor position.

5. A method according to claim 1, wherein the step of determining an offset comprises:
producing an angular speed error based on a difference between the speed command and the rotor speed;
converting the angular speed error to a mechanical angular error; and
converting the mechanical angular error to an electrical angular error.

6. A method according to claim 5, wherein the step of converting the angular speed error comprises:
converting the angular speed error to an angle; and
limiting the angle based on at least one of a minimum torque generation of the electric motor, a maximum resolver misalignment, and a direction of the offset.

7. A method according to claim 5, wherein the electric motor has a pre-determined number of pole-pairs, and wherein the step of converting the mechanical angular error comprises multiplying the mechanical angular error by the pre-determined number of pole-pairs.

8. A method according to claim 5, further comprising filtering an electrical torque ripple induced oscillation from the electrical angular error, the electrical torque ripple produced by the electric motor.

9. A method according to claim 5, further comprising producing a transformation angle from a difference between the rotor position and the electrical angular error; and
wherein the operating step comprises:
producing an error based on a difference between the d-axis current command and a sensed d-axis current;
converting the error to a synchronous d-axis voltage command; and
transforming the synchronous d-axis voltage command to a stationary d-axis voltage command with the transformation angle, the stationary d-axis voltage command producing a phase current for driving the electric motor, the sensed d-axis current derived from the phase current.

10. A method for aligning a resolver, the resolver operable to determine a rotor position in an electric motor with respect to a d-axis, the electric motor configured to drive a load, the method comprising the steps of:
decoupling the load from the electric motor;
commanding a current command and a speed command;
operating the electric motor at a non-zero speed in response to the current command and the speed command, the electric motor generating substantially zero torque in response to the current command;
determining an offset of the resolver;
coupling the load to the electric motor; and
determining the rotor position based on the offset.

11. A method according to claim 10, wherein the electric motor has a drag torque associated with an operation thereof, and wherein the step of commanding a current command comprises selecting a d-axis current command based on the drag torque of the electric motor and a pre-determined accuracy of the offset.

12. A method according to claim 11, wherein the step of commanding a current command comprises commanding a q-axis current command of about zero while commanding a d-axis current command less than zero.

13. A method according to claim 10, wherein the electric motor has a pre-determined number of pole-pairs, and wherein the step of determining an offset comprises:
determining a resolver speed;
producing an angular speed error based on a difference between the speed command and the resolver speed;
converting the angular speed error to a mechanical angular error;
multiplying the mechanical angular error by the pre-determined number of pole-pairs to produce an electrical angular error;
determining the rotor position; and
producing a transformation angle based on a difference between the rotor position and the electrical angular error.

14. A method according to claim 13, wherein the step of operating comprises:
producing a current error based on a difference between the current command and a d-axis synchronous current;
producing a stationary voltage command based on the current error via the transformation angle;
producing a voltage based on the stationary voltage command;
supplying the voltage to the electric motor; and
determining the d-axis synchronous current based on the voltage via the transformation angle.

15. A method according to claim 10, wherein the step of determining the rotor position comprises:
commanding a nominal d-axis current command;
operating the electric motor in response to the nominal d-axis current command;
determining the rotor position; and
adjusting the rotor position by the offset.

16. A system for aligning a resolver, the resolver operable to sense a rotor position in an electric motor with respect to a d-axis, the system comprising:
a current regulator having an input for receiving a current command and having an output for coupling to the electric motor, the current regulator configured to produce a current based on the current command, the electric motor generating substantially zero torque in response to the current; and
a speed regulator having an input for receiving a speed command and the rotor position and having an output coupled to the current regulator, the speed regulator configured to:
maintain a substantially constant speed of the electric motor in response to the speed command; and
produce an offset when maintaining the substantially constant speed, the offset aligning the rotor position with the d-axis, wherein the offset is based at least in part on the speed command.

17. A system according to claim 16, wherein the current command comprises a d-axis current command less than zero and a q-axis current command of about zero; wherein the current regulator is configured to produce the current based on the d-axis current command and a transformation angle; wherein the speed regulator is configured to:
determine an electrical angular error based on the speed command and a resolver speed;
produce the transformation angle based on a difference between the rotor position and the electrical angular error; and
produce the offset based on the electrical angular error; and wherein the electric motor has a drag torque during an operation thereof and generates an electrical torque based on the transformation angle, the electrical torque balancing the drag torque.

18. A system according to claim 17, wherein the electric motor has a pre-determined number of pole-pairs, and wherein the speed regulator comprises:
- a first summing block having a first input for receiving the speed command, a second input for receiving a resolver speed, and an output, the first summing block configured to produce an angular speed error based on a difference between the speed command and the resolver speed;
- a proportion-integral (PI) controller having an input coupled to the output of the first summing block and having an output, the PI controller configured to convert the angular speed error to an angle;
- a limiter having an input coupled to the output of the PI controller and having an output, the limiter configured to produce a mechanical angular error based on the angle, the angle limited between a maximum angle and a minimum angle;
- a first gain block having an input coupled to the output of the limiter and having an output, the first gain block configured to produce the electrical angular error based on a product of the mechanical angular error and the pre-determined number of pole-pairs; and
- a second summing block having a first input coupled to the output of the first gain block, a second input for receiving the rotor position, and an output coupled to the second input of the current regulator, the second summing block configured to produce the transformation angle based on a difference between the rotor position and the electrical angular error.

19. A system according to claim 18, wherein the speed regulator further comprises a filter coupled to the output of the first gain block, the filter configured to remove a torque ripple induced oscillation from the electrical angular error.

20. A system according to claim 18, wherein the electric motor has a drag torque during an operation thereof, and wherein the speed regulator further comprises a second gain block having an input for receiving the speed command and having an output coupled to the second summing block, the second gain block configured to compensate for the drag torque in the transformation angle.

* * * * *